United States Patent
Kang et al.

(10) Patent No.: US 7,314,684 B2
(45) Date of Patent: Jan. 1, 2008

(54) LAYER CATHODE METHODS OF MANUFACTURING AND MATERIALS FOR LI-ION RECHARGEABLE BATTERIES

(75) Inventors: Sun-Ho Kang, Naperville, IL (US); Khalil Amine, Downers Grove, IL (US)

(73) Assignee: U Chicago Argonne LLC, Chicago, IL (US)

( * ) Notice: Subject to any disclaimer, the term of this patent is extended or adjusted under 35 U.S.C. 154(b) by 652 days.

(21) Appl. No.: 10/800,292

(22) Filed: Mar. 12, 2004

(65) Prior Publication Data

US 2004/0234854 A1    Nov. 25, 2004

Related U.S. Application Data

(60) Provisional application No. 60/454,930, filed on Mar. 14, 2003.

(51) Int. Cl.
| | |
|---|---|
| *H01M 4/58* | (2006.01) |
| *H01M 4/00* | (2006.01) |
| *H01M 4/50* | (2006.01) |
| *C01D 1/02* | (2006.01) |
| *C01G 23/00* | (2006.01) |

(52) U.S. Cl. ............... 429/231.95; 429/223; 429/224; 429/229; 429/231.1; 429/231.5; 429/231.6; 423/594.4; 423/594.6; 423/598; 423/599

(58) Field of Classification Search ............ 429/231.1, 429/223, 224, 231.6, 229, 231.5; 423/594.4, 423/594.6, 598, 599
See application file for complete search history.

(56) References Cited

FOREIGN PATENT DOCUMENTS

| | | | |
|---|---|---|---|
| JP | 9-035715 | * | 2/1997 |
| JP | 2003-034537 | * | 2/2003 |

* cited by examiner

*Primary Examiner*—Patrick Joseph Ryan
*Assistant Examiner*—Thomas H. Parsons
(74) *Attorney, Agent, or Firm*—Foley & Lardner LLP

(57) ABSTRACT

A positive electrode active material for lithium-ion rechargeable batteries of general formula $Li_{1+x}Ni_\alpha Mn_\beta A_\gamma O_2$ and further wherein A is Mg, Zn, Al, Co, Ga, B, Zr, or Ti and $0<x<0.2$, $0.1 \leq \alpha \leq 0.5$, $0.4 \leq \beta \leq 0.6$, $0 \leq \gamma \leq 0.1$ and a method of manufacturing the same. Such an active material is manufactured by employing either a solid state reaction method or an aqueous solution method or a sol-gel method which is followed by a rapid quenching from high temperatures into liquid nitrogen or liquid helium.

21 Claims, 4 Drawing Sheets

Figure 1:
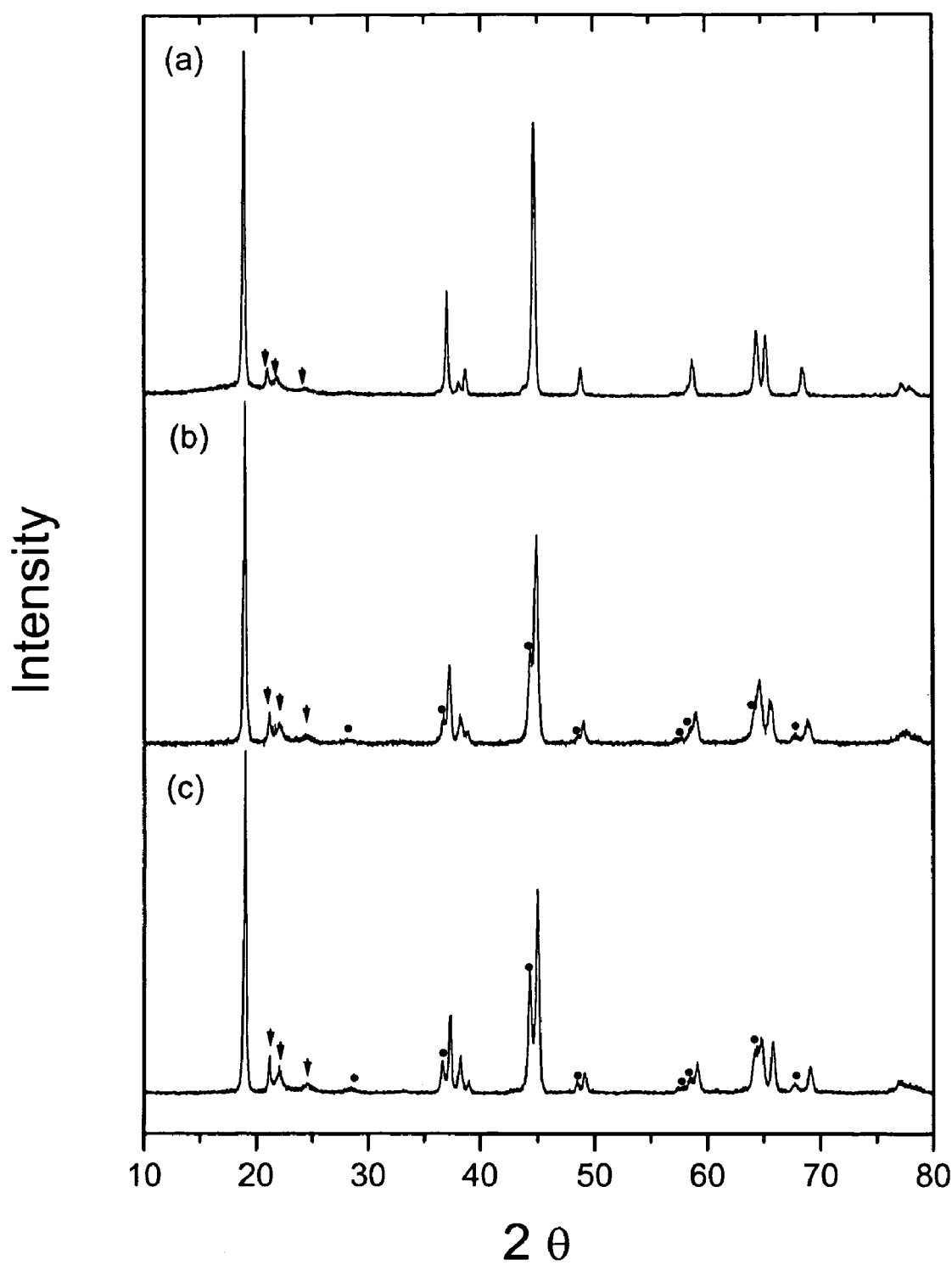

LAYER CATHODE METHODS OF MANUFACTURING AND MATERIALS FOR LI-ION RECHARGEABLE BATTERIES

CROSS-REFERENCE TO RELATED PATENT APPLICATIONS

The present application is related to and claims priority from U.S. Prov. Appl. Ser. No. 60/454,930 which was filed on Mar. 14, 2003 and titled "LAYERED $Li_{1+x}Ni_\alpha Mn_\beta A_\gamma O_2$ CATHODE MATERIALS FOR Li-ION RECHARGEABLE BATTERIES AND METHODS OF MANUFACTURING THE SAME" and which is hereby incorporated by reference into the present application.

The United States Government has rights in this invention pursuant to Contract W-31-109-ENG-38 between the U.S. Department of Energy and The University of Chicago representing Argonne National Laboratory.

FIELD OF THE INVENTION

The present invention relates to a positive active material for lithium-ion rechargeable batteries. More particularly, the present invention relates to a positive active material based on layered lithium nickel-manganese oxide doped with various elements.

BACKGROUND OF THE INVENTION

Current lithium-ion batteries, or cells, use a solid reductant as the anode and a solid oxidant as the cathode. Solid-state, high energy-density batteries use metallic lithium as the anode. Lithium metal is a preferred electrode material as a result of its superior thermodynamic and kinetic properties. In addition, lithium is a good conductor of electricity and heat. Furthermore, lithium's malleability and ductility make it an excellent metal with which to work. However, lithium has well-known drawbacks when used as an anode material. For example, lithium is very reactive and often creating flammability concerns.

When the battery is discharged, the anode supplies $Li^+$ ions to the $Li^+$ ion electrolyte and electrons to the external circuit. The cathode is typically an electronically conducting host into which $Li^+$ ions are inserted reversibly from the electrolyte as a guest species and are charge-compensated by electrons from the external circuit. Due to the unique properties of lithium, active materials have been developed for use in lithium-ion batteries. Primary batteries or cells are those in which the chemical reaction supplying the electrons is not reversible with respect to the closed universe of the battery. A secondary battery, or cell, utilizes a reaction which can be reversed when current is applied to the battery, thus "recharging" the battery. The chemical reactions at the anode and cathode of a lithium secondary battery must be reversible. On charge, the removal of electrons from the cathode by an external field releases $Li^+$ ions back to the electrolyte to restore the parent host structure, and the addition of electrons to the anode by the external field attracts charge-compensating $Li^+$ ions back into the anode to restore it to its original composition.

Li—Co—O and Li—Co—Ni—O based materials are currently utilized as cathodes in lithium-ion rechargeable batteries. Although useful, lithium-ion rechargeable batteries which include Li—Co—O and Li—Co—Ni—O based materials for cathodes include a number of drawbacks. In particular, the cobalt is very expensive, and the use of cobalt and nickel results in environmental issues and thermal safety concerns.

There is therefore a need for electrode materials that have improved properties and require less expensive materials.

SUMMARY OF THE INVENTION

The system of the present invention comprises a Li—Ni—Mn—A—O based material, where A may be a variety of metals, such as but not limited to Mg, Zn, Ga, B, Zr, Ti and Co. The A metals are utilized in very small amounts. These materials in their phase-pure state are good performers. However, during manufacture, as the systems are cooled after calcination, inactive phases develop which significantly lowers their performance. One advantageous feature of the present invention is utilizing a rapid quench directly after the high temperature calcination step to rapidly cool the layered oxides, thereby preventing growth of these undesirable phases.

It has been found that this technique works effectively for materials made by any of several cathode forming processes, such as for example but not limited to, a solid-state reaction method, an aqueous solution method, or a sol-gel method. When manufactured by such methods, layered cathodes utilizing lithium with less expensive mixed metal oxides and containing at least some manganese provide acceptable performance and cost a little over half as much as the current commercial lithium cobalt cathode systems. Materials utilized as cathodes in lithium-ion rechargeable cells according to the present invention exhibit increased discharge capacity, stable cycling performance, improved safety, and lowered impedance. The present invention could be incorporated into rechargeable lithium-ion batteries for electric vehicles, hybrid electric vehicles and portable electronic devices. The positive electrode active material for lithium-ion rechargeable battery of the present invention is represented by the general formula $Li_{1+x}Ni_\alpha Mn_\beta A_\gamma O_2$ wherein A is Mg, Zn, Al, Co, Ga, B, Zr, or Ti and $0 < x \leq 0.2$, $0.1 \leq \alpha \leq 0.5$, $0.4 \leq \beta \leq 0.6$, $0 < \gamma \leq 0.1$ having a layered structure.

It is therefore an object of the present invention to provide an improved positive active material with very high capacity for lithium-ion rechargeable battery which is stable at high voltage.

It is another object of the present invention to provide an improved method of manufacturing the positive active material having the above characteristics.

These and other objects, advantages and features of the invention together with the organization and manner of operation thereof will become apparent from the following detailed description when taken into conjunction with the accompanying drawings.

DETAILED DESCRIPTION OF THE DRAWINGS

Figure 2A:
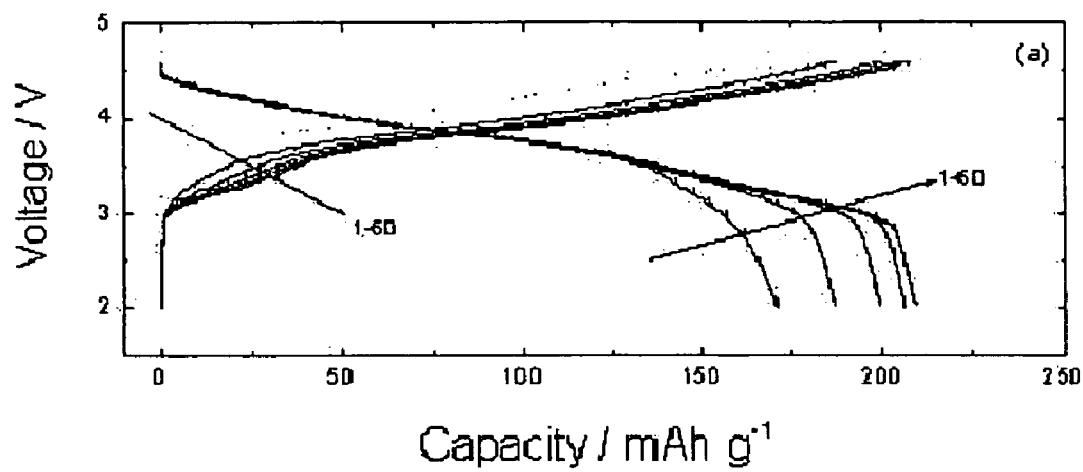
Figure 2B:
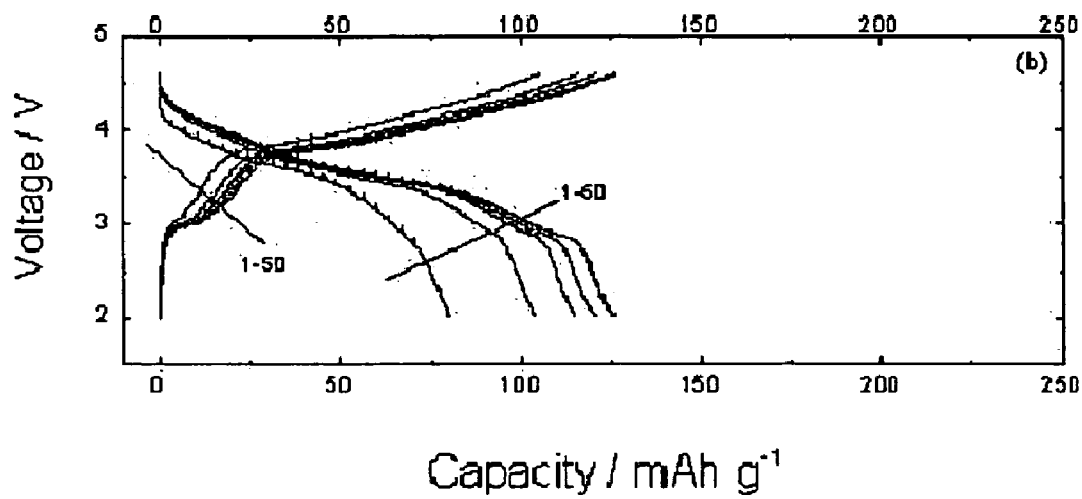
Figure 2C:
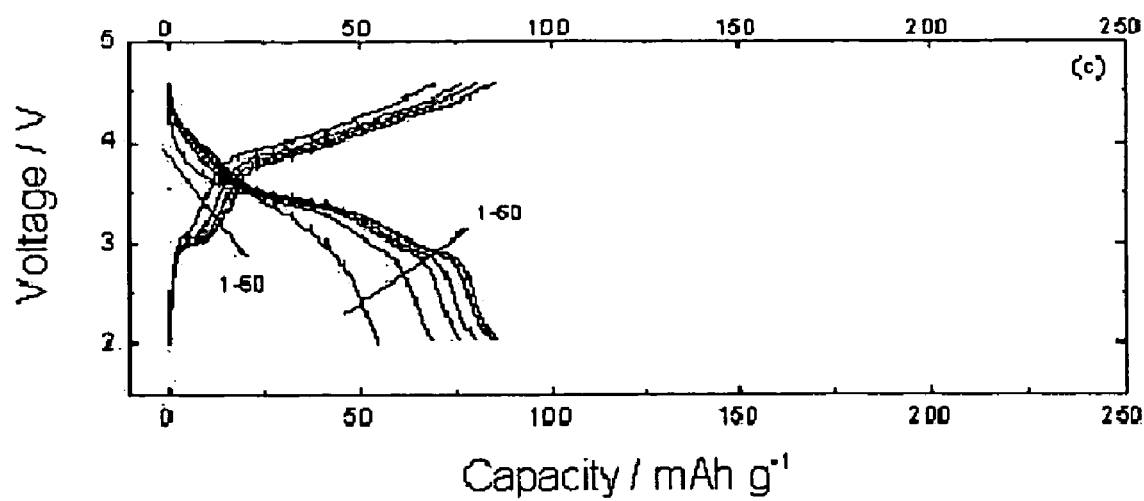
Figure 3:
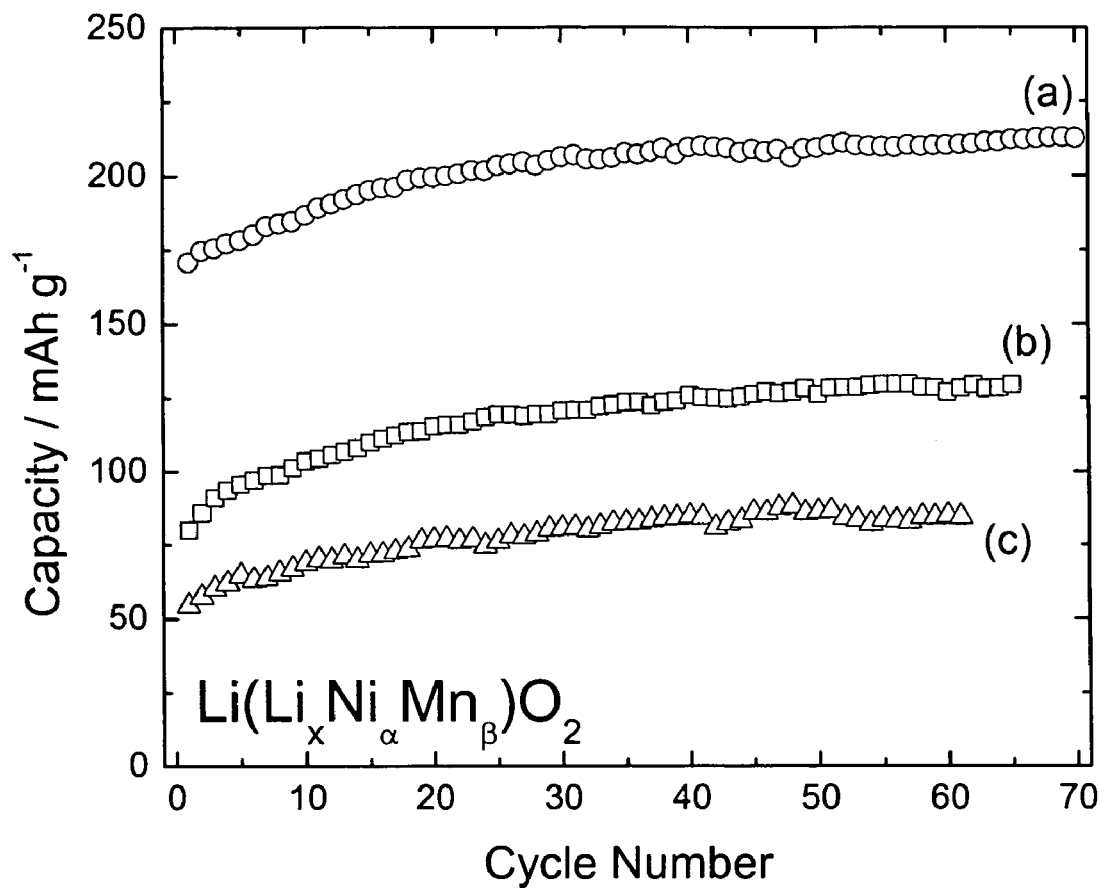

FIG. 1 shows X-ray diffraction patterns (a) of $Li(Li_{0.17}Ni_{0.25}Mn_{0.58})O_2$ calcined at 900° C. and quenched into liquid nitrogen; (b) after then being cooled at 2° C./min; and (c) after then being cooled at 0.5° C./min (c);

FIG. 2(a) shows charge/discharge curves of $Li(Li_{0.17}Ni_{0.25}Mn_{0.58})O_2$ quenched into liquid nitrogen; FIG. 2(b) shows charge/discharge curves of $Li(Li_{0.17}Ni_{0.25}Mn_{0.58})O_2$ cooled at 2° C./min; and FIG. 2(c) shows charge/discharge curves of $Li(Li_{0.17}Ni_{0.25}Mn_{0.58})O_2$ and cooled at 0.5° C./min (c); and FIG. 3 shows the variation of discharge capacity with cycling number (a) of $Li(Li_{0.17}Ni_{0.25}Mn_{0.58})O_2$ calcined at 900° C. and then quenched into liquid nitrogen; and (b) after then being cooled at 2° C./min; and (c) after then being cooled at 0.5° C./min.

DETAILED DESCRIPTION OF THE PREFERRED EMBODIMENTS

The present invention provides an improved positive active material with a very high capacity for use in an electrode, such as but not limited to a cathode in a lithium-ion rechargeable battery which is stable at high voltage. The present invention also relates to improved method of manufacturing the positive active material having the above characteristics. In one embodiment, the present invention relates to a material and method for making the same, wherein the material has the general formula $Li_{1+x}Ni_{\alpha}Mn_{\beta}A_{\gamma}O_2$ and further wherein A is Mg, Zn, Al, Co, Ga, B, Zr, or Ti and $0<x\leq0.2$, $0.1\leq\alpha\leq0.5$, $0.4\leq\beta\leq0.6$, $0<\gamma\leq0.1$.

In one embodiment, a solid-state reaction method is employed to create the positive active material. In this embodiment, amounts of lithium hydroxide (or lithium carbonate), (Ni,Mn)-hydroxide, and A-hydroxide (or A oxide; A=Mg, Zn, Al, Co, Ga, B, Zr, Ti) are mixed in acetone using zirconia balls for about 12-24 hours to form a mixed powder. Next the positive electrode active material is manufactured by firing the mixture of lithium carbonate (or lithium hydroxide), (Ni,Mn)-hydroxide, and A-hydroxide (or A-oxide), preferably calcining the mixed powder at about 450~550° C. for about 12-30 hours in air and then calcining the mixed powder at about 900-1100° C. for about 10-24 hours either in an air or an nitrogen-oxygen atmosphere. This is followed by a rapid quenching into liquid nitrogen.

In another embodiment, an aqueous solution method is employed to create the positive active material. Lithium hydroxide, nickel hydroxide, manganese acetate, and A-hydroxide (or A-nitrate) are used as starting materials for the synthesis. Appropriate amounts of lithium hydroxide, nickel hydroxide, and A-hydroxide (or A-nitrate; A=Mg, Zn, Al, Co, Ga) are dissolved in distilled water whose pH is adjusted with nitric acid. An aqueous solution of manganese acetate is added to the solution to form a mixed solution. The mixed solution is refluxed in a round bottom flask attached with a condenser at about 80° C. for about 12-24 hours. Next, the mixed solution is evaporated in a rotary vacuum evaporator. The organic contents in the mixed solution are eliminated by heating at about 400° C. for about 2 hours. The calcination is carried out in a temperature range of about 900-1100° C. for about 10-24 hours in either in an air or an nitrogen-oxygen atmosphere. This step is followed by a rapid quenching into liquid nitrogen.

In yet another embodiment, a sol-gel method is employed to create the positive active material. Acetates of lithium, nickel, manganese, and A are employed as starting materials; and glycolic acid/tartaric acid solution is used as a chelating agent. Appropriate amounts of lithium acetate, nickel acetate, manganese acetate, A-acetate (or A-nitrate; A=Mg, Zn, Al, Co, Ga) are dissolved in distilled water. A glycolic/tartaric acid solution is added for use as a chelating agent. The pH of the resulting solution is adjusted to about 7~8, preferably using ammonium hydroxide. The solution is continuously stirred and heated, preferably on a hot plate to form a gel precursor. The gel precursor is decomposed at about 450 C. about for about 5 hours in air to form a decomposed powder. The calcinations are preferably carried out in a temperature range from about 900 C. to 1100 C. for about 10-24 hours in air or nitrogen/oxygen mixture atmospheres. This is followed by a rapid quenching into liquid nitrogen.

In one embodiment, the material in accordance with the principles of the present invention has a composition of $Li_{1+x}Ni_{\alpha}Mn_{\beta}O_2$, wherein x is between about 0 and 0.2, $\alpha$ is between about 0.2 and 0.5, and $\beta$ is between about 0.5 and 0.6.

The material in accordance with the principles of the present invention, in another embodiment has a composition of $Li_{1+x}Ni_{\alpha}Mn_{\beta}Mg_{\gamma}O_2$, wherein x is between about 0 and 0.2, $\alpha$ is between about 0.1 and 0.5, $\beta$ between about 0.4 and 0.6, and $\gamma$ is between about 0.01 and about 0.1.

In yet another embodiment, present invention comprises a material composed of $Li_{1+x}Ni_{\alpha}Mn_{\beta}Al_{\gamma}O_2$, wherein x is between about 0 and 0.2, $\alpha$ is between about 0.15 and 0.5, $\beta$ is between about 0.45 and 0.6, and $\gamma$ is between about 0.01 and about 0.1.

In yet another embodiment, the material in accordance with the principles of the present invention has a composition of $Li_{1+x}Ni_{\alpha}Mn_{\beta}Co_{\gamma}O_2$, wherein x is between about 0 and 0.2, $\alpha$ is between about 0.15 and 0.5, $\beta$ is between about 0.45 and 0.6, and $\gamma$ is between about 0.01 and about 0.1.

The material in accordance with the principles of the present invention, in another embodiment, has a composition of $Li_{1+x}Ni_{\alpha}Mn_{\beta}Ti_{\gamma}O_2$, wherein x is between about 0 and 0.2, $\alpha$ is between about 0.2 and 0.5, the $\beta$ is between about 0.4 and 0.6, and $\gamma$ is between about 0.01 and about 0.1.

In one embodiment, the active material in accordance with the principles of the present invention may be used as a cathode. In accordance with the principles of the present invention, the active material may be used in a rechargeable lithium-ion battery.

In one example, an undoped system $Li(Li_{0.17}Ni_{0.25}Mn_{0.58})O_2$ was selected as an example of positive electrode active material of a high-energy lithium-ion rechargeable battery and the sol-gel method was selected as the manufacturing method. The sol-gel preparation of the lithium nickel manganese oxide was investigated by using lithium acetate, nickel acetate, and manganese acetate. Each starting material was dissolved in distilled water and added to glycolic/tartaric acid solution that was used as a chelating agent. The solution pH was adjusted to around 7 using ammonium hydroxide. The entire process was conducted under continuous stirring and heating on a hot plate. The resulting gel precursor was decomposed at 450° C. for 5 hours in air. The decomposed powders were then fired at 900° C. for 24 hours in air atmosphere. Finally, the calcined powders were quenched rapidly into liquid nitrogen. To demonstrate the effectiveness of the rapid quenching, materials which were slowly cooled (for example, at a rate of about 2° C./min and 0.5° C./min) were also manufactured.

X-ray diffraction analysis of the obtained $Li(Li_{0.17}Ni_{0.25}Mn_{0.58})O_2$, as shown in FIGS. 1(a)-1(c) show an ordered rock-salt structure (crystallographic structure of R3̄m) with extra peaks at 20~25° (marked with arrows) (shown at FIG. 1(a)). These are generally attributed to cation ordering (Li/Mn and/or Li/Ni) in the transition metal layers. The materials cooled at slower rates, shown at FIG. 1(b) and FIG. 1(c), show many extra peaks (marked with circles) over the whole 2θ range, which is a typical character of monoclinic symmetry.

In order to study the electrochemical properties of $Li(Li_{0.17}Ni_{0.25}Mn_{0.58})O_2$ powder obtained as described above, coin type cells were made and galvanostatically cycled. The cathode mixture consisted of 80 wt. % active material, 10 wt. % carbon, and 10 wt. % Polyvinylidene fluoride (PVDF) as a binder. The negative electrode was metallic lithium and the electrolyte was 1 M $LiPF_6$ in a 1:1 mixture of ethylene carbonate (EC)/diethyl carbonate (DEC). The galvanostatic cycling was performed in the voltage range of 2.0-4.6V at a current density of 0.1 mA/cm².

FIGS. 2(a)-2(c) and FIG. 3 show the charge/discharge characteristics and cycling performance of the obtained Li(Li$_{0.17}$Ni$_{0.25}$Mn$_{0.58}$)O$_2$. The obtained materials exhibited very high discharge capacity of 210 mAh/g with excellent cycling performance, whereas the samples cooled at slow rates delivered discharge capacities only of 130 mAh/g (2° C./min cooling) and 85 mAh/g (0.5° C./min).

While several embodiments have been shown and described in this application, it is understood that changes and modifications can be made to the invention without departing from the invention's broader aspects.

What is claimed is:

1. A method for forming an electrode material made of substituted lithium nickel-manganese oxides, comprising the steps of:
    producing compositions of Li$_{1+x}$Ni$_\alpha$Mn$_\beta$A$_\gamma$O$_2$ wherein A is chosen from the group consisting of Mg, Zn, Al, Co, Ga, B, Zr, and Ti, and further wherein x is between about 0 and 0.2, $\alpha$ is between about 0.1 and 0.5, $\beta$ between about 0.4 and 0.6, and $\gamma$ between about 0 and about 0.1 through a electrode forming process chosen from the group consisting of a solid-state reaction method, an aqueous solution method, and a sol-gel method;
    further wherein the solid-state reaction method comprises the steps of:
        mixing amounts of lithium hydroxide (or lithium carbonate), (Ni,Mn)-hydroxide, and A-hydroxide or A oxide (wherein A is chosen from the group consisting of Mg, Zn, Al, Co, Ga, B, Zr, and Ti) in acetone using zirconia balls for about 12-24 hours to form a mixed powder;
        calcining the mixed powder at about 450~550° C. for about 12-30 hours in air;
        calcining the mixed powder at about 900-1100° C. for about 10-24 hours either in an air or an nitrogen/oxygen atmosphere; and
        rapidly quenching the calcined powders into liquid nitrogen.

2. The method of claim 1, wherein x is between about 0 and 0.2, $\alpha$ is between about 0.2 and 0.5, and $\beta$ is between about 0.5 and 0.6.

3. The method of claim 1, wherein A is Mg and further wherein x is between about 0 and 0.2, $\alpha$ is between about 0.1 and 0.5, $\beta$ between about 0.4 and 0.6, and $\gamma$ is between about 0.01 and about 0.1.

4. The method of claim 1, wherein A is Al and further wherein x is between about 0 and 0.2, $\alpha$ is between about 0.15 and 0.5, $\beta$ is between about 0.45 and 0.6, and $\gamma$ is between about 0.01 and about 0.1.

5. The method of claim 1, wherein A is Co and further wherein x is between about 0 and 0.2, $\alpha$ is between about 0.15 and 0.5, $\beta$ is between about 0.45 and 0.6, and $\gamma$ is between about 0.01 and about 0.1.

6. The method of claim 1, wherein A is Ti and further wherein x is between about 0 and 0.2, $\alpha$ is between about 0.2 and 0.5, the $\beta$ is between about 0.4 and 0.6, and $\gamma$ is between about 0.01 and about 0.1.

7. An electronic device comprising an electrode comprised of the electrode material produced by the method of claim 1 and wherein the electrode is a cathode comprising a mixture of about 80 weight percent of the electrode material, about 10 weight percent carbon, and about 10 weight percent polyvinylidene difluoride as a binder.

8. A method for forming an electrode material made of substituted lithium nickel-manganese oxides, comprising the steps of:
    producing compositions of Li$_{1+x}$Ni$_\alpha$Mn$_\beta$A$_\gamma$O$_2$ wherein A is chosen from the group consisting of Mg, Zn, Al, Co, Ga, B, Zr, and Ti, and further wherein x is between about 0 and 0.2, $\alpha$ is between about 0.1 and 0.5, $\beta$ between about 0.4 and 0.6, and $\gamma$ between about 0 and about 0.1 through a electrode forming process chosen from the group consisting of a solid-state reaction method, an aqueous solution method, and a sol-gel method;
    further wherein the aqueous solution method comprises the steps of:
        dissolving appropriate amounts of lithium hydroxide, nickel hydroxide, and A-hydroxide or A-nitrate (wherein A is chosen from the group consisting of Mg, Zn, Al, Co, and Ga) in water;
        adding an aqueous solution of manganese acetate to form a mixed solution;
        refluxing the mixed solution in a round bottom flask attached with a condenser at about 80° C. for about 12-24 hours;
        evaporating the mixed solution in a rotary vacuum evaporator;
        eliminating the organic contents in the mixed solution at about 400° C. for about 2 hours;
        calcining the resulting powder at about 900-1100° C. for about 10-24 hours in either an air or an nitrogen/oxygen atmosphere; and
        rapidly quenching the calcined powders into liquid nitrogen.

9. The method of claim 8, wherein x is between about 0 and 0.2, $\alpha$ is between about 0.2 and 0.5, and $\beta$ is between about 0.5 and 0.6.

10. The method of claim 8, wherein A is Mg and further wherein x is between about 0 and 0.2, $\alpha$ is between about 0.1 and 0.5, $\beta$ between about 0.4 and 0.6, and $\gamma$ is between about 0.01 and about 0.1.

11. The method of claim 8, wherein A is Al and further wherein x is between about 0 and 0.2, $\alpha$ is between about 0.15 and 0.5, $\beta$ is between about 0.45 and 0.6, and $\gamma$ is between about 0.01 and about 0.1.

12. The method of claim 8, wherein A is Co and further wherein x is between about 0 and 0.2, $\alpha$ is between about 0.15 and 0.5, $\beta$ is between about 0.45 and 0.6, and $\gamma$ is between about 0.01 and about 0.1.

13. The method of claim 8, wherein A is Ti and further wherein x is between about 0 and 0.2, $\alpha$ is between about 0.2 and 0.5, the $\beta$ is between about 0.4 and 0.6, and $\gamma$ is between about 0.01 and about 0.1.

14. An electronic device comprising an electrode comprised of the electrode material produced by the method of claim 8 and wherein the electrode is a cathode comprising a mixture of about 80 weight percent of the electrode material, about 10 weight percent carbon, and about 10 weight percent polyvinylidene difluoride as a binder.

15. A method for forming an electrode material made of substituted lithium nickel-manganese oxides, comprising the steps of:
    producing compositions of Li$_{1+x}$Ni$_\alpha$Mn$_\beta$A$_\gamma$O$_2$ wherein A is chosen from the group consisting of Mg, Zn, Al, Co, Ga, B, Zr, and Ti, and further wherein x is between about 0 and 0.2, $\alpha$ is between about 0.1 and 0.5, $\beta$ between about 0.4 and 0.6, and $\gamma$ between about 0 and about 0.1 through a electrode forming process chosen from the group consisting of a solid-state reaction method, an aqueous solution method, and a sol-gel method;

further wherein the sol-gel method comprises the steps of:
  dissolving appropriate amounts of lithium acetate, nickel acetate, manganese acetate, A-acetate or A-nitrate; (wherein A is chosen from the group consisting of Mg, Zn, Al, Co, and Ga) in water;
  adding a glycolic/tartaric acid solution for use as a chelating agent;
  adjusting the pH of the resulting solution to about 7 to about 8 using ammonium hydroxide;
  continuously stirring and heating the solution on a hot plate to form a gel precursor;
  decomposing the gel precursor at 450° C. about for about 5 h in air to form a decomposed powder;
  calcining the decomposed powders at about 900-1100° C. for about 10-24 hours in either an air or an nitrogen/oxygen atmosphere; and
  rapidly quenching the calcined powders into liquid nitrogen.

16. The method of claim 15, wherein x is between about 0 and 0.2, $\alpha$ is between about 0.2 and 0.5, and $\beta$ is between about 0.5 and 0.6.

17. The method of claim 15, wherein A is Mg and further wherein x is between about 0 and 0.2, $\alpha$ is between about 0.1 and 0.5, $\beta$ between about 0.4 and 0.6, and $\gamma$ is between about 0.01 and about 0.1.

18. The method of claim 15, wherein A is Al and further wherein x is between about 0 and 0.2, $\alpha$ is between about 0.15 and 0.5, $\beta$ is between about 0.45 and 0.6, and $\gamma$ is between about 0.01 and about 0.1.

19. The method of claim 15, wherein A is Co and further wherein x is between about 0 and 0.2, $\alpha$ is between about 0.15 and 0.5, $\beta$ is between about 0.45 and 0.6, and $\gamma$ is between about 0.01 and about 0.1.

20. The method of claim 15, wherein A is Ti and further wherein x is between about 0 and 0.2, $\alpha$ is between about 0.2 and 0.5, the $\beta$ is between about 0.4 and 0.6, and $\gamma$ is between about 0.01 and about 0.1.

21. An electronic device comprising an electrode comprised of the electrode material produced by the method of claim 15 and wherein the electrode is a cathode comprising a mixture of about 80 weight percent of the electrode material, about 10 weight percent carbon, and about 10 weight percent polyvinylidene difluoride as a binder.

* * * * *

UNITED STATES PATENT AND TRADEMARK OFFICE
CERTIFICATE OF CORRECTION

PATENT NO. : 7,314,684 B2
APPLICATION NO. : 10/800292
DATED : January 1, 2008
INVENTOR(S) : Sun-Ho Kang and Khalil Amine It is certified that error appears in the above-identified patent and that said Letters Patent is hereby corrected as shown below:

Column 7, line 12, "solution to about" should be --solution to between about--.

Column 7, line 17, "5 h" should be --5 hours--.

Signed and Sealed this

Fifteenth Day of July, 2008

JON W. DUDAS
*Director of the United States Patent and Trademark Office*